US012264420B2

(12) United States Patent
Ikeda et al.

(10) Patent No.: US 12,264,420 B2
(45) Date of Patent: Apr. 1, 2025

(54) METHOD FOR THERMAL MOLDING OF FILAMENT PRODUCT

(71) Applicant: UNITIKA LTD., Amagasaki (JP)

(72) Inventors: Kohei Ikeda, Uji (JP); Mariko Honda, Uji (JP); Yuta Mizuno, Okazaki (JP); Shohei Ikegami, Okazaki (JP)

(73) Assignee: UNITIKA LTD., Amagasaki (JP)

( * ) Notice: Subject to any disclaimer, the term of this patent is extended or adjusted under 35 U.S.C. 154(b) by 579 days.

(21) Appl. No.: 17/279,877

(22) PCT Filed: Sep. 26, 2019

(86) PCT No.: PCT/JP2019/037850
§ 371 (c)(1),
(2) Date: Mar. 25, 2021

(87) PCT Pub. No.: WO2020/067285
PCT Pub. Date: Apr. 2, 2020

(65) Prior Publication Data
US 2021/0395926 A1    Dec. 23, 2021

(30) Foreign Application Priority Data
Sep. 29, 2018  (JP) ................. 2018-186181

(51) Int. Cl.
| D04H 1/541 | (2012.01) |
| B29C 65/00 | (2006.01) |
| B29C 65/02 | (2006.01) |
| D01D 5/10 | (2006.01) |
| D01F 8/12 | (2006.01) |
| D01F 8/14 | (2006.01) |
| D02G 3/04 | (2006.01) |
| D04B 1/16 | (2006.01) |
| D04H 3/045 | (2012.01) |

(52) U.S. Cl.
CPC ............ *D02G 3/045* (2013.01); *B29C 65/02* (2013.01); *B29C 66/05* (2013.01); *B29C 66/69* (2013.01); *B29C 66/712* (2013.01); *D01D 5/10* (2013.01); *D01F 8/12* (2013.01); *D01F 8/14* (2013.01); *D04B 1/16* (2013.01); *D04H 1/5412* (2020.05); *D04H 3/045* (2013.01); *D10B 2331/02* (2013.01); *D10B 2331/041* (2013.01); *D10B 2507/02* (2013.01)

(58) Field of Classification Search
CPC .. D04H 1/5412; D04H 1/43828; D04H 3/147; B32B 2262/12; B32B 2262/124; B32B 2262/128; B32B 2262/132; B32B 2262/136; D01F 8/12; D01F 8/14
See application file for complete search history.

(56) References Cited

U.S. PATENT DOCUMENTS

| 3,839,139 | A | * | 10/1974 | Ito | A01G 13/0268 428/206 |
| 4,378,725 | A | * | 4/1983 | Hospers | D07B 5/00 57/7 |
| 5,068,141 | A | * | 11/1991 | Kubo | D04H 3/16 428/397 |
| 5,814,569 | A | * | 9/1998 | Suzuki | B32B 5/08 442/364 |
| 7,238,423 | B2 | * | 7/2007 | Calhoun | B32B 5/08 442/364 |
| 7,452,832 | B2 | * | 11/2008 | Bansal | D04H 3/147 442/364 |
| 8,895,459 | B2 | * | 11/2014 | Dahringer | D04H 3/147 442/364 |
| 10,808,342 | B2 | * | 10/2020 | Andoh | D04H 3/045 |
| 11,186,931 | B2 | * | 11/2021 | Hanaya | D04H 1/5412 |
| 11,525,220 | B2 | * | 12/2022 | Hanaya | D21H 13/24 |

(Continued)

FOREIGN PATENT DOCUMENTS

| JP | S51-116220 | 10/1976 |
| JP | S57-128217 | 8/1982 |

(Continued)

OTHER PUBLICATIONS

The extended European search report issued for European Patent Application No. 19864715.8, Feb. 16, 2023, 7 pages.

(Continued)

*Primary Examiner* — Atul P. Khare
(74) *Attorney, Agent, or Firm* — HSML P.C.

(57) ABSTRACT

Provided is a thermal molding method for producing a thermally molded article having excellent abrasion resistance at its melt-fused part. Polyamide 6 and a copolyester are prepared separately. The copolyester contains terephthalic acid, ethylene glycol, and 1,4-butanediol as copolymerization units. The copolyester may further contain ε-caprolactone and/or diethylene glycol as a copolymerization unit. A multifilament yarn in which core-sheath type composite filaments each containing a core component and a sheath component at a ratio of 1 to 4:1 by mass are bundled is produced by a composite melt-spinning method using the polyamide 6 as the core component and the copolyester as the sheath component. Using the multifilament yarn, a product of filaments is produced by weaving, knitting, knitting and braiding, or braiding. The product of filaments is heated to melt the copolyester and fuse the core-sheath type composite filaments to each other while retaining the initial filament form of the polyamide 6, thus thermally molding the product of filaments.

7 Claims, No Drawings

(56) References Cited

U.S. PATENT DOCUMENTS

| | | | | |
|---|---|---|---|---|
| 2008/0160278 A1* | 7/2008 | Cheng | ................. | D04H 1/5412 |
| | | | | 428/221 |
| 2011/0084425 A1* | 4/2011 | Yamamoto | ........... | D04H 1/5418 |
| | | | | 264/319 |
| 2021/0054537 A1 | 2/2021 | Ikeda et al. | | |
| 2023/0257909 A1* | 8/2023 | Madeleine | ............... | D01D 5/32 |
| | | | | 442/361 |

FOREIGN PATENT DOCUMENTS

| | | | |
|---|---|---|---|
| JP | H04-222221 | | 8/1992 |
| JP | 2001-271245 A | | 10/2001 |
| JP | 2001271270 A | * | 10/2001 |
| JP | 2003310090 A | * | 11/2003 |
| JP | 2004176223 A | * | 6/2004 |
| JP | 2007-092225 | | 4/2007 |
| JP | 2007-113156 | | 5/2007 |
| JP | 4007845 B2 | | 11/2007 |
| JP | 2009114712 A | * | 5/2009 |
| JP | 2009-299209 | | 12/2009 |
| JP | 2013023786 A | * | 2/2013 |
| JP | 2019-163575 | | 9/2019 |

OTHER PUBLICATIONS

Office Action issued for Korean Patent Application No. 10-2021-7008309, Dec. 8, 2022, 10 pages including machine translation.
International Search Report of PCT/JP2019/037850, Dec. 24, 2019, 5 pages.
International Preliminary Report on Patentability of PCT/JP2019/037850, Mar. 23, 2021, 6 pages.

* cited by examiner

METHOD FOR THERMAL MOLDING OF FILAMENT PRODUCT

TECHNICAL FIELD

The present invention relates to a method for thermal molding a product of filaments by applying heat and, if necessary, pressure, the product of filaments including a multifilament yarn in which core-sheath type composite filaments are bundled, and particularly relates to a thermal molding method which can produce a thermally molded article having excellent abrasion resistance.

BACKGROUND ART

It is conventionally known to produce products of filaments such as woven fabrics and nets using a multifilament yarn in which core-sheath type composite filaments including polyethylene terephthalate as a core component and polyethylene as a sheath component are bundled. It is also known that the products of filaments are used for mesh sheets, fishing nets, and the like. For the mesh sheet and the fishing net, it is further known that the products of filaments are thermally molded to soften or melt polyethylene, which is the sheath component of a core-sheath type composite filament, to result in melt-bonding intersections of the woven fabric and the net, in order to prevent distortion or slippage of the threads. The above technique is described in Patent Literature 1.

However, when the woven fabric or the like described in Patent Literature 1 was thermally molded, it was found that abrasion resistance of the melt-bonded part was insufficient. In order to solve the problem, the applicant has proposed a method disclosed in Patent Literature 2. The method suggested in Patent Literature 2 uses a specific polyethylene having a melt flow rate of 10 to 15 g/10 minutes under measurement conditions of a temperature of 280° C. and a load of 2.16 kg as a sheath component, thereby improving the abrasion resistance of the melt-bonded part.

CITATIONS LIST

Patent Literature

Patent Literature 1: Japanese Unexamined Patent Publication No. 2009-299209
Patent Literature 2: Japanese Patent Application No. 2018-50348

SUMMARY OF INVENTION

Technical Problems

An object of the present invention is also to provide a thermal molding method for producing a thermally molded article having excellent abrasion resistance in its melt-bonded part after thermal molding, as the invention described in Patent Literature 2.

Solutions to Problems

The present invention has solved the above-mentioned problem by using a specific copolyester as the sheath component and using polyamide 6 as the core component of a core-sheath type composite filament. That is, the present invention relates to a method for thermal molding a product of filaments, the method comprising:

a step of producing multifilament yarns by bundling core-sheath type composite filaments, wherein the core-sheath type composite filaments are obtained by a composite melt-spinning method, using a copolyester containing terephthalic acid, ethylene glycol, and 1,4-butanediol as copolymerization units for a sheath component, and using polyamide 6 for a core component, and the core-sheath type composite filaments have a mass ratio of core component:sheath component being 1 to 4:1;

a step of producing a product of filaments using the multifilament yarns; and a step of heating the product of filaments to melt the copolyester and fuse the core-sheath type composite filaments to each other while retaining initial filament form of the core component of polyamide 6.

In the present invention, a specific copolyester is prepared firstly. In this copolyester, terephthalic acid is used as an acid component, and ethylene glycol and 1,4-butanediol are used as diol components of copolymerization units. The acid component and the diol component are present equimolar in the copolyester, but by adjusting the molar ratio of 1,4-butanediol, which is a diol component, the melting point is adjusted to about 140 to 180° C. Specifically, the amount of 1,4-butanediol is increased such that the ratio of ethylene glycol and 1,4-butanediol is about 1:1 to 1.5 (molar ratio) to set the melting point of the copolyester in a specific range. Diethylene glycol may be further used as the diol component, if necessary. The copolymerization ratio of diethylene glycol is such that the ratio of ethylene glycol and diethylene glycol is about 1:0.01 to 0.05 (molar ratio). Further, ε-caprolactone in which one end becomes a carboxylic acid group and the other end becomes a hydroxyl group when its ring is opened may be used if necessary. The copolymerization ratio of ε-caprolactone is such that the ratio of ethylene glycol and ε-caprolactone is about 1:0.1 to 0.5 (molar ratio). Both diethylene glycol and ε-caprolactone may be used in combination. By including diethylene glycol and/or ε-caprolactone in the copolymerization unit, the melting point can be adjusted, and the abrasion resistance of the fused sheath component can be further improved.

Polyamide 6 is prepared, together with the preparation of the specific copolyester mentioned above. As the polyamide 6, conventionally known polyamide 6 is used. Since the melting point of polyamide 6 is in the range of 220 to 230° C., the polyamide 6 of the core component does not melt at the temperature at which the copolyester of the sheath component melts and retains its initial filament form. Then, after producing core-sheath type filaments by a composite melt-spinning method using the copolyester as the sheath component and the polyamide 6 as the core component, the core-sheath type filaments are bundled to produce a multifilament yarn. In the composite melt-spinning method, the shape of a nozzle hole and the discharge amounts of the core component and the sheath component from the nozzle hole are adjusted so that the mass ratio of the core component and the sheath component is 1 to 4:1. If the mass ratio of the sheath component is lower than the above range, the abrasion resistance of the fused part is decreased, which is not preferable. Further, if the mass ratio of the sheath component is higher than the above range, the diameter of the core component that retains the initial filament form becomes small, and the tensile strength of the produced thermally molded article decreases, which is not preferable. It should be noted that, although the fineness of the core-sheath type composite filament is arbitrary, it is generally about 4 to 20 dtex, and although the number of bundled core-sheath type composite filaments in producing a multifilament yarn is also arbitrary, it is generally about 30 to 400 filaments. Further, it is preferable that the core and the sheath of the core-sheath type composite filament are arranged substantially concentrically. If the arrangement is eccentric, the filament tends to shrink during thermal molding, resulting in poor shape stability.

A product of filaments is produced using the multifilament yarn. The multifilament yarn may be untwisted, but it is generally twisted. As the product of filaments, for example, a woven fabric may be produced by weaving the multifilament yarns as warps and wefts, or the multifilament yarns may be hung on a warp knitting machine or a weft knitting machine to produce a knitted fabric. Further, a knotted net or a knotless net may be produced by hanging the multifilament yarns on a netting machine and twisting or braiding a plurality of the multifilament yarns. Moreover, a cord may be produced by braiding a plurality of the multifilament yarns. When producing a product of filaments, one multifilament yarn may be used, or a yarn thread having a plurality of the multifilament yarns arranged in parallel and twisted as desired may be used.

Next, the obtained product of filaments is heated and thermally molded. The heating temperature is equal to or higher than the melting point of the copolyester of the sheath component of the core-sheath type composite filament, and specifically 140° C. or higher. The copolyester is melted by heating, and the core-sheath type composite filaments are fused with each other while the polyamide 6 of the core component retains its initial filament form, thus producing a thermally molded article. For example, in a case where a coarse knitted or woven fabric or a net is used as a product of filaments, and the knitted or woven fabric or the net is heated to melt the copolyester, a thermally molded article having firmly fused intersections of the knitted or woven fabric or the net is produced. It should be noted that the intersection of a knitted or woven fabric or a net is, for example, the intersection of the warp and the weft in a woven fabric, and the knot in a knitted fabric or a net. Further, the copolyester of the sheath component in parts other than the intersections (for example, the strands of a net) may also be melted and the whole of a product of filaments may be fused to produce into a highly rigid thermally molded article. Such thermally molded article can be favorably used at a construction site as a mesh sheet or a peeling-prevention sheet in which the threads are hard to be distorted and slipped. Further, the highly rigid thermally molded article can be suitably used as a fishing net such as fixed net, basket net, or aquaculture net.

Advantageous Effects of Invention

In a method for thermal molding of a product of filaments according to the present invention, in which the product of filaments includes core-sheath type composite filaments having a specific copolyester as a sheath component, the core-sheath type composite filaments are fused to each other with the copolyester, providing the effect of improving the abrasion resistance of the fused part. When a thermally molded article produced by the method for thermal molding according to the present invention is used for a fishing net, the following effects are provided specifically. That is, cleaning of a fishing net is performed by scraping off dirt such as algae and shellfish adhering to the fishing net with a brush or a water flow, but the thermally molded article having good abrasion resistance prevents the fishing net from damage and breakage during cleaning. Further, when the thermally molded article is used for a mesh sheet or a peeling-prevention sheet, washing and cleaning work are also performed and as in the case of a fishing net, it prevents it from distortion and slippage of the threads and damage.

EXAMPLES

Example 1

[Preparation of Multifilament Yarn]

As a sheath component, a copolyester having a melting point of 160° C. was prepared. This copolyester included 86.8 mol of terephthalic acid, 36.8 mol of ethylene glycol, 49.2 mol of 1,4-butanediol, 13.2 mol of ε-caprolactone, and 0.8 mol of diethylene glycol in terms of the molar ratio of copolymerization units. On the other hand, polyamide 6 having a melting point of 225° C. was prepared as a core component. The above-mentioned copolyester and polyamide 6 were supplied to a composite melt-spinning apparatus equipped with a core-sheath type composite spinneret having a hole diameter of 0.6 mm and 192 holes, and composite melt-spinning was performed with the spinneret temperature being set to 270° C. and the ratio of the copolyester and polyamide 6 being 1:2.7 by mass. A yarn thread in which the produced 192 core-sheath type composite filaments were bundled was subjected to cooling, stretching, and relaxation treatments by a conventional means to produce a multifilament yarn with 1670 dtex/192 filaments.

[Preparation of Product of Filaments and Thermal Molding)]

A yarn thread having two of the produced multifilament yarns arranged in parallel were wound on a bobbin for braiding, and then introduced into an 8-carrier square braiding machine to produce an 8-strand braid. In the 8-strand braid, the sheath components of the core-sheath type composite filaments in the braid were fused to each other under the conditions of a temperature of 180° C. and a time of 1 minute to produce a thermally molded cord in which the whole was integrated.

Example 2

A thermally molded cord was produced by the same method as Example 1 except that the ratio of the copolyester and polyamide 6 was changed to 1:1.5 (by mass).

Example 3

A yarn thread was produced, in which 16 of the multifilament yarns produced in Example 1 were arranged in parallel. By hanging four of the yarn threads on a braid netting machine and braiding the yarn threads, a knotless net having strands and intersections was produced. This knotless net was introduced into a pin tenter type heat treatment apparatus and heat-treated for 3 minutes in an atmosphere of 180° C. while applying tension in the width direction. Subsequently, it was left at room temperature and cooled to produce a thermally molded net. In this thermally molded net, the sheath components were melted, and the core-sheath type composite filaments were fused to each other at both the strand parts and the intersections. In addition, the diameter of the strand was about 4 mm and the area of the intersections part was about 40 mm$^2$, and the mesh had a square shape and had an area of about 6 cm$^2$. Using the net, a tubular and rectangular parallelepiped aquaculture net was produced.

Comparative Example 1

Except that polyethylene (manufactured by Japan Polyethylene Corporation, product number UJ580) with a melt flow rate of 59.8 g/10 minutes (the melt flow rate value under the conditions of a temperature of 280° C., a load of 2.16 kgf) at a melting point of 123° C. was used as the sheath component, a multifilament yarn with 1670 dtex/192 filaments was produced in the same method as Example 1. Using the multifilament yarn, a thermally molded cord was produced by the same method as Example 1 except that the temperature was set to 150° C.

Comparative Example 2

Except that polyethylene terephthalate (the melting point 256° C., the limiting viscosity [η] 0.75) was used instead of the polyamide 6 as the core component, 8-strand braid was produced by the same method as Example 1. Then, in the 8-strand braid, the sheath components of the core-sheath type composite filaments in the braid were fused to each other under the conditions of a temperature of 180° C. and a time of 1 minute to produce a thermally molded cord in which the whole was integrated. The limiting viscosity [η] was measured at a concentration of 0.5 g/dl and a liquid temperature of 20° C. using an equal-weight mixture of phenol and ethane tetrachloride as a solvent.

The thermally molded cords produced in Examples 1 and 2 and Comparative Example 1 were evaluated for abrasion resistance using an abrasion resistance tester manufactured by Yonekura Mfg. Co., Ltd. Specifically, a 1 kg weight was hung on one end of a thermally molded cord, and the other end was gripped with a chuck so as to be made contact with a hexagonal rod at a right angle. Then, the other end was reciprocated. The reciprocation was performed for about 20 minutes with the number of reciprocating motions of 30±1 time/minute and a stroke width of 230 mm±30 mm. As a result, the thermally molded cords according to Examples 1 and 2 kept the initial fused state to some extent, though waste was generated. On the other hand, in the thermally molded cord according to Comparative Example 1, the fusion came undone and the multifilament yarns were exposed to become fibrous. From the above, it is shown that the thermally molded cords according to Examples 1 and 2 have excellent abrasion resistance. Further, it is shown that the thermally molded net according to Example 3, in which the strands are braided, has excellent abrasion resistance as with the thermally molded cords according to Examples 1 and 2.

[Test for Bending Fatigue]

Using the thermally molded cords produced in Examples 1 and 2 and Comparative Examples 1 and 2 as samples, a bending fatigue test was performed by the following method.

First, in accordance with JIS L-1013 (2000) 8.5.1 tensile strength test for standard condition, the tensile strength (N) of each sample before bending was measured using Autograph AG-1 manufactured by Shimadzu Corporation at a grip interval of 250 mm and a tensile speed of 300 mm/min. Each sample was subjected to a MIT type folding endurance tester manufactured by MYS-TESTER Company Limited and bent at an angle of ±120° and a test speed of 175 times/minute. The number of bendings was 500, 2000 and 5000. The tensile strength (N) was measured for each sample after the bendings by the same method as mentioned above, and the results are shown in Table 1. Then, the strength retention (%) was calculated by the following formula and the results are shown in Table 2. Strength retention (%)=[(Tensile strength of a sample after bendings (N))/(Tensile strength of a sample before bendings (N))]× 100.

TABLE 1

[Tensile strength (N)]

|  | Before bendings | After 500 bendings | After 2000 bendings | After 5000 bendings |
|---|---|---|---|---|
| Example 1 | 543 | 542 | 551 | 520 |
| Example 2 | 452 | 476 | 463 | 432 |
| Comparative Example 1 | 459 | 459 | 421 | 414 |
| Comparative Example 2 | 482 | 421 | 307 | 225 |

TABLE 2

[Strength retention (%)]

|  | Before bendings | After 500 bendings | After 2000 bendings | After 5000 bendings |
|---|---|---|---|---|
| Example 1 | 100 | 99.8 | 101.5 | 95.8 |
| Example 2 | 100 | 105.5 | 102.5 | 95.6 |
| Comparative Example 1 | 100 | 100 | 91.8 | 90.2 |
| Comparative Example 2 | 100 | 87.4 | 63.6 | 46.7 |

[Durability Test Against Alkalinity]

Using the 8-strand braids and the thermally molded cords produced in Examples 1 and 2 and Comparative Example 2 as samples, durability tests against alkalinity were performed by the following two methods.

(1) Test for Strength Retention (%)

A 3N sodium hydroxide aqueous solution was prepared using sodium hydroxide (99%, manufactured by Maruzen Co., Ltd.). Next, the samples (8-strand braids and thermally molded cords) were immersed in the sodium hydroxide aqueous solution having a weight 10 times or more the weight of the samples and left to stand for 960 hours. Subsequently, the samples were pulled out of the sodium hydroxide aqueous solution, rinsed in pure water for 10 seconds×2 times, and then washed with running water for 1 minute. Next, the dried samples from which water contained in the samples was removed by air-drying for 2 days were measured for tensile strength (N1) under the same conditions as in the above-mentioned bending fatigue test. Then, the tensile strength (N0) of the 8-strand braids and the thermally molded cords before immersion in sodium hydroxide aqueous solution was also measured under the same conditions, and the strength retention (%)=(N1/N0)× 100 was calculated.

(2) Test for Weight Loss Rate (%)

The samples (8-strand braids and thermally molded cords) before immersion in the sodium hydroxide aqueous solution was placed in a dryer at 50° C. for 24 hours, and then placed in a desiccator containing a desiccant for 1 hour or more. Subsequently, the weight (W0) of each sample was measured at room temperature. On the other hand, the dried samples of the above-mentioned (1) were placed in a dryer at 50° C. for 24 hours, and then placed in a desiccator containing a desiccant for 1 hour or more. Subsequently, the weight (W1) of each sample was measured at room temperature. Then, the weight loss rate (%)=[(W0−W1)/W0]× 100 was calculated.

The test results of the strength retention (%) of the above-mentioned (1) and the test results of the weight loss rate (%) of the above-mentioned (2) are shown in Table 3.

TABLE 3

|  |  | N0 | N1 | Strength retention (%) | Weight loss rate (%) |
|---|---|---|---|---|---|
| Example 1 | (8-strand braid) | 564 | 500 | 88.7 | 26.8 |
| Example 1 | (thermally molded cord) | 533 | 453 | 85.0 | 26.8 |
| Example 2 | (8-strand braid) | 513 | 423 | 82.5 | 39.9 |
| Example 2 | (thermally molded cord) | 477 | 413 | 86.4 | 36.9 |
| Comparative Example 2 | (8-strand braid) | 475 | 174 | 36.6 | 70.0 |
| Comparative Example 2 | (thermally molded cord) | 480 | 403 | 83.9 | 6.0 |

[Durability Test Against Acidity]

The strength retention (%) and the weight loss rate (%) were tested by the same method as [Durability test against alkalinity] except that sulfuric acid (98%, guaranteed reagent, manufactured by Kanto Chemical Co., Inc.) was used instead of the 3N sodium hydroxide aqueous solution to make a 5N acidic aqueous solution. The results are shown in Table 4.

TABLE 4

|  |  | N0 | N1 | Strength retention (%) | Weight loss rate (%) |
|---|---|---|---|---|---|
| Example 1 | (8-strand braid) | 564 | 133 | 23.6 | 1.7 |
| Example 1 | (thermally molded cord) | 533 | 156 | 29.2 | −5.3 |
| Example 2 | (8-strand braid) | 513 | 232 | 45.3 | 7.8 |
| Example 2 | (thermally molded cord) | 477 | 368 | 77.2 | −0.1 |
| Comparative Example 2 | (8-strand braid) | 475 | 471 | 99.3 | 0.2 |
| Comparative Example 2 | (thermally molded cord) | 480 | 474 | 98.6 | 0.0 |

For reference, a yarn thread in which two nylon multifilament yarns (manufactured by Unitika Ltd., product number "N742", 940 dtex/96 filaments) were arranged in parallel was wound around a bobbin for braiding, and then introduced into an 8-carrier square braiding machine and an 8-strand braid was produced. This 8-strand braid was subjected to the durability test against acidity mentioned above and the strength retention (%) was measured. As a result, the initial tensile strength (N0) was 838N, but the tensile strength (N1) after the immersion treatment was 123N, and the strength retention (%) was 14.7%. Polyamide resins tend to be inferior in durability to acids, but the multifilament yarns used in the Examples has a core-sheath type composite filament with the sheath of the copolyester and the core of the polyamide 6, in which the polyamide 6 is covered with the copolyester, so that the strength retention (%) against acidity is improved as compared with the case where a nylon multifilament yarn is used.

The invention claimed is:

1. A method of producing a heat molded knotless net, the method comprising:
   a step of producing multifilament yarns by bundling core-sheath type composite filaments, wherein the core-sheath type composite filaments are obtained by a composite melt-spinning method, using a copolyester containing terephthalic acid, ethylene glycol, and 1,4-butanediol as copolymerization units for the sheath component of the composite filaments, and using polyamide 6 for the core component of the composite filaments, and wherein the core-sheath type composite filaments have a mass ratio of core component:sheath component being 1 to 4:1;
   a step of braiding 4 or 8 of the multifilament yarns to form a knotless net having braided strands and intersections of the multifilament yarns forming the knotless net; and
   a step of heating the knotless net to melt the copolyester and fuse the core-sheath type composite filaments to each other while the core component of polyamide 6 of the composite filaments maintains an initial form that is a form prior to the step of heating the knotless net to melt the copolyester.

2. The method of producing the heat molded knotless net according to claim 1, wherein the copolyester further contains ε-caprolactone and/or diethylene glycol as copolymerization units.

3. The method of producing the heat molded knotless net according to claim 1, wherein each multifilament yarn of the plurality of the multifilament yarns are arranged in parallel.

4. The method of producing the heat molded knotless net according to claim 1, wherein each of the multifilament yarns includes about 30 to 400 of the composite filaments.

5. The method of producing the heat molded knotless net according to claim 1, wherein the step of heating the knotless net to melt the copolyester is at a temperature of 140° C. or higher and 180° C. or lower.

6. The method of producing the heat molded knotless net according to claim 1, wherein the maintaining of the initial form of the core component of polyamide 6 of the composite filaments includes the core component of polyamide 6 not melting during the step of heating the knotless net to melt the copolyester.

7. A method of forming a fishing net, comprising forming the heat molded knotless net obtained by the method according to claim 1 to into a rectangular parallelepiped fishing net.

* * * * *